March 31, 1970 D. J. KIDGELL ET AL 3,503,108

CUTTING AND SAWING BLADES

Original Filed Dec. 31, 1963

INVENTORS
FRANK A. BESHA
DAVID J. KIDGELL

BY

Fraser and Bogucki
ATTORNEYS

United States Patent Office 3,503,108
Patented Mar. 31, 1970

3,503,108
CUTTING AND SAWING BLADES

David J. Kidgell, Excelsior, Minn., and Frank A. Besha, Los Gatos, Calif., assignors to International Business Machines Corporation, New York, N.Y., a corporation of New York Original application Dec. 31, 1963, Ser. No. 334,829, now Patent No. 3,399,649. Divided and this application Mar. 11, 1968, Ser. No. 739,958
Int. Cl. B26d *1/12*
U.S. Cl. 29—103 5 Claims

ABSTRACT OF THE DISCLOSURE

An extremely thin cutting and sawing blade, suitable for forming the required gap in magnetic recording and reproducing heads, comprises a circular disc having a typical thickness of about 0.0001–0.001 inch, and in the form of a metallic body, stable to temperatures of about 1000° F. or above. A thin, uniform layer of hard, high temperature resistant, metal-containing cutting and sawing material and having a thickness corresponding to that of the body is bonded to the outer periphery of the body.

Figure 1:
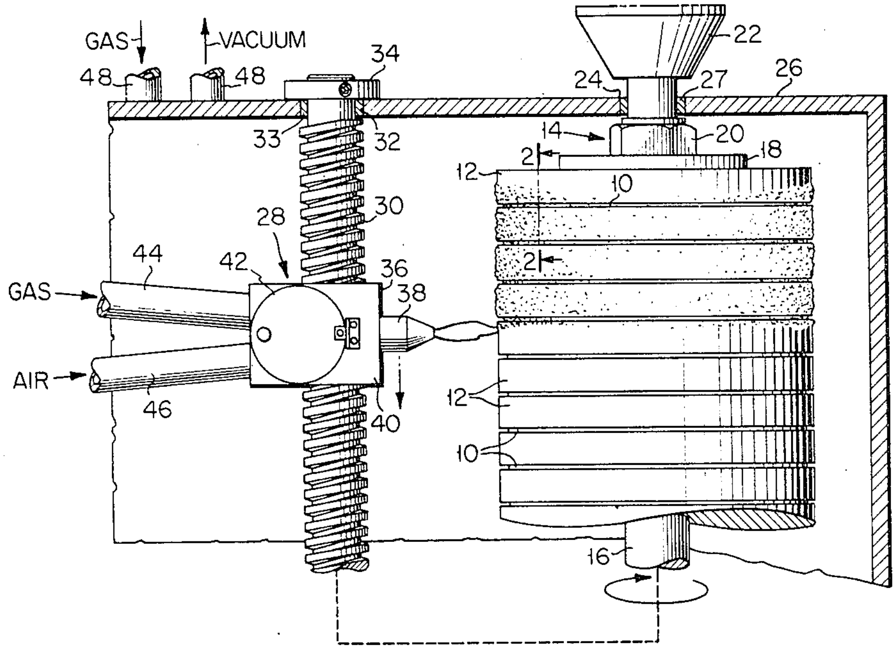

This application is a division of copending application Ser. No. 334,829, filed Dec. 31, 1963, now Patent No. 3,399,649.

The present invention generally relates to sawing means and more particularly relates to improved means for making extremely fine saw cuts, a method of making the improved sawing means and apparatus for carrying out the method.

In magnetic recording and reproducing heads, a gap is present in order to provide a fringing flux which intersects magnetic material, such as a magnetic tape or disk, upon which recording or reproducing is to be effected. As the magnetic flux in the magnetic head is changed by variation of an energizing current in the head coil, the flux impresses a corresponding magnetization pattern on the magnetic material forming the recording medium so that recording is effected. In reproduction, the magnetic flux extending immediately above the recording member is intercepted by the gap of the magnetic head and a current is generated in a coil wound around the magnetic head, whereby a signal is produced which represents the recorded pattern.

The conventional way of providing the required gap in a magnetic head is to fabricate the head in two pieces and then to join the pieces together with a spacer therebetween at one or both ends, the spacer having a width corresponding to the desired width of the gap to be provided in the magnetic head. Thus, a high degree of precision is required in the manufacture and assembly of the two pieces of the magnetic head and of the spacer to be incorporated in the magnetic head. Difficulties are frequently encountered in assuring that the gap provided in the magnetic head in this manner has parallel and smooth sides so as to provide a uniform magnetic flux. A preferred method of inserting the gap is to cut the gap into an otherwise closed loop of material, thus avoiding back gap losses and a number of fabricating steps. This method, however, has not been used heretofore for extremely small gap spacings.

There is an increasing tendency to fabricate magnetic heads with smaller gap widths, because the upper limit of the frequency which can be recorded and reproduced and the density with which digital data can be recorded and reproduced are directly dependent, in a mathematical relationship, upon the narrowness of the gap in the magnetic head. As higher frequency and higher density requirements tend to continually decrease the width of the magnetic head gap, the problems of adequately providing a minute magnetic head gap with parallel side walls become increasingly severe. The problems are accentuated with digital recording head assemblies which must have minimum misalignment among a number of heads used for parallel recording. With the symmetrical type of head, precise alignment mechanisms, and also deskewing circuitry, must be used.

Since some magnetic heads are made of solid ferrite material which is brittle and cracks rather readily, fabrication difficulties connected with this type of construction are increased. Other types of magnetic heads may employ a plurality of laminations of a magnetic metallic material, which design also presents complicated manufacturing problems. It is recognized that material advantages over prior art techniques can be obtained if it is possible to form minute magnetic head gaps by merely cutting or sawing away segments of the material forming the magnetic head. However, since the minute gaps called for with the newer high density magnetic recording equipment have widths of the order of magnitude of only a few ten thousandths of an inch, for example 0.0001–0.001 inch, heretofore it has been found to be impractical to fabricate a cutter blade sufficiently thin and durable to accurately cut the desired magnetic head gap in the hard metallic material used in the magnetic head.

Similar difficulties in providing extremely thin sections or cuts in hard materials are frequently encountered in other fields. For example, a new technique has been specifically devised for cutting thin sections of semiconductor crystals, glass, ceramics, carbides, sapphires and the like. Such technique employs an extremely small diameter wire (.005″) placed under tension and moved across the semiconductor crystal or other hard work-piece at a high rate of speed. An abrasive slurry of silicon carbide in oil is applied to the surface of the work-piece to be cut and also the cutting surface of the wire. The motion of the wire across the work-piece draws embedded abrasive against the work-piece, thus facilitating the cutting. However, this procedure is known to be extremely slow and is subject to vibration which tends to cause the walls of the gap being formed in the work-piece to be non-parallel. Moreover, associated equipment used with the wire is relatively expensive and is subject to severe wear due, for example, to the presence of the carbide grinding slurry, which tends to foul the mechanism involved in moving the wire back and forth across the work-piece. Thus, it will be obvious that for such applications, as well as for the cutting of magnetic head gaps, it would be highly desirable to provide a rapid and effective means of cutting or sawing material to extremely small thicknesses.

Accordingly, the principal object of the present invention is to provide means for effectively sawing gaps of minute width in hard work materials.

It is a further object of the present invention to provide improved means for sawing gaps having widths of the order of thickness of about 0.0001–0.001 inch.

It is also an object of the present invention to provide a simple inexpensive method of making such improved sawing means.

It is another object of the present invention to provide simple, inexpensive apparatus for carrying out the present method.

It is still a further object of the present invention to provide simple, inexpensive, durable high speed sawing means capable of sawing minute gaps in magnetic heads with precision.

These and other objects are accomplished, in accordance with the present invention, by fabricating an improved extremely thin sawing blade by the present method utilizing apparatus of the present invention. The blade is capable of operating at high speeds of rotation, the centrifugal force generated thereby being sufficient to maintain the blade stiff and in a single plane, so as to facilitate accurate high speed sawing. The present method of making the blade is carried out by forming an improved uniform cutting edge on the periphery of an extremely thin sawing blade, the edge having increased durability and being characterized by a width substantially completely identical with that of the main body or substrate of the saw blade. The edge is also of controlled depth.

In accordance with the method, one or a plurality of very thin cutter blades, having thicknesses of about 0.0001–0.001 inch, and preferably generally circular in outline, are disposed on a rotating means, such as an arbor, between spacer elements which abut each side thereof. The spacer elements each have a shape substantially identical to that of the blades but are dimensioned so that they extend beyond the periphery of the blades a distance sufficiently greater than the desired depth or thickness of the layer of cutting material to be deposited on the periphery of the blades so that such layer is discontinuous with that formed on the periphery of the spacers during the deposition. It has been found that for practical purposes the difference in radius between the blades and spacers should be at least about twice the desired depth of the layer of cutting material to be deposited. This is the case for the usual desired depths of deposition which are less than about .003 inch. The mounted blade or blades and spacers are then heated to an elevated temperature sufficient to facilitate bonding of the cutting material which is to be deposited on the periphery of the blades. The blade or blades and spacers are then maintained at such elevated temperature while they are rotated, preferably in an inert atmosphere. During such rotation the periphery of each blade is uniformly coated with fine particles of cutting material, such as molten tungsten metal particles. The cutting material is a high temperature hard metal or the like capable of improving the durability, and the cutting and sawing ability of the blades. When the cutting material has been uniformly deposited on the periphery of the blades to the required depth, the rotation and flame spraying are discontinued and the blades are allowed to cool to about ambient temperature, after which the blades are separated from the rotating means and spacing means and are ready for use.

As a specific example, a plurality of circular cobalt-nickel-chromium alloy blades having a uniform width of about 0.00025 inch and a diameter of 1.58 inch are mounted on an arbor, with washers of the same shape but of greater width and with a diameter about .0012 inch larger than the diameter of the blades disposed therebetween. The washers and arbor have been precoated with a methanolic solution of magnesium methoxide which is $(CH_3O)_2$ Mg. which ultimately breaks down to magnesium oxide upon heating and which prevents sticking of the sprayed cutting material thereon. The spacer-blade-arbor assembly is secured tightly together and is then preheated to about 1100–1200° F., whereupon it is rotated in an argon atmosphere at about 60 r.p.m. while the edge of each of the blades is subjected to flame spraying of tungsten thereon. The spraying is carried out utilizing a conventional gas-air flame spraying unit which supplies a fine spray of molten tungsten from a distance of 1.75–2.0 inches from the blades. The flame sprayed tungsten penetrates into the gaps between the washers and builds up on the revolving periphery of each of the blades mounted on the arbor to a desired uniform depth of about 0.002 inch.

The spraying operation is then discontinued, and the arbor-blade-washer assembly is allowed to cool to ambient temperature and is disassembled. Each sawing blade is thus provided with an improved cutting or sawing periphery which comprises tungsten metal having a uniform depth (0.002 inch) and a uniform width (0.00025 inch). No tungsten extends beyond the normal width (0.00025 inch) of the blade, so that the finished blade is smooth and balanced with respect to weight distribution, allowing it to be operated at a high cutting or sawing speed without vibration. The tungsten deposited on the periphery of each blade is permanently bonded thereto, while the tungsten deposited on the washers and arbor during the flame spraying operation does not stick thereto, due to the presence of the magnesium-oxide coating thereon, and can be easily removed. The improved blades thus provided are capable of cutting or sawing gaps of, for example 0.00025 inch width and having parallel walls in the hard metal of magnetic recording and reproducing heads. In carrying out such cutting operation, the blades are rotated at a very high speed, for example about 35,000 to 100,000 r.p.m. Such cutting is relatively rapid and is uniform. Moreover, due to the hardness and high temperature stability of the tungsten, the useful life of the cutting edge of each blade is relatively long.

The foregoing and other objects, features and advantages of the invention will be apparent from the following more particular description of a preferred embodiment of the invention, as illustrated in the accompanying drawings.

Figure 2:
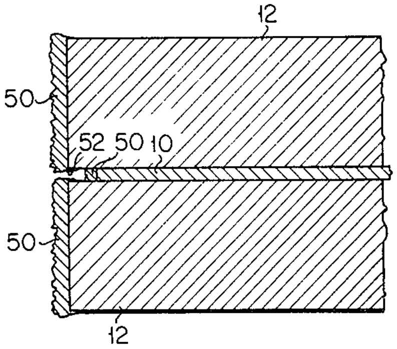
Figure 3:
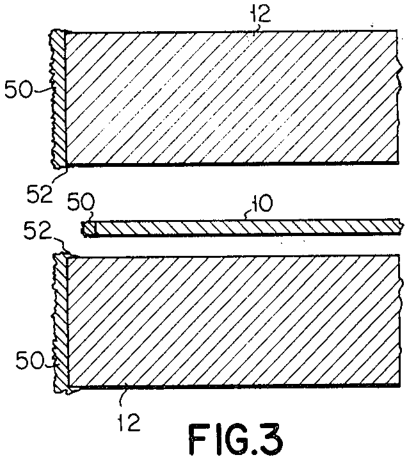

FIG. 1 is a fragmentary schematic top plan view of one embodiment of apparatus in accordance with the present invention;

FIG. 2 is an enlarged schematic fragmentary cross-section taken along the line 2—2 of FIG. 1, illustrating a portion of a cutting blade and adjacent washers after the build-up of an edge of cutting material on the periphery thereof; and, FIG. 3 is an enlarged schematic fragmentary cross-section illustrating the blade and washers of FIG. 2 after separation from one another during disassembly of the apparatus of FIG. 1.

Now referring more particularly to FIG. 1 of the accompanying drawings, a schematic representation of a preferred embodiment of apparatus in accordance with the present invention is illustrated in top plan view. The apparatus is suitable for carrying out the present method, particularly for flame spraying the desired cutting material on the periphery of saw blades. It will be understood that, if desired, vapor deposition of the cutting material could be employed instead of flame spraying while utilizing the same assembly of work pieces as shown in FIG. 1. However, flame spraying is preferred and the present method will be set forth hereinafter with reference thereto, although said flame spraying is not the only way of carrying out the present method. The apparatus of FIG. 1 includes a plurality of cutting or sawing blades 10 which may be of any suitable shape but which are preferably generally circular in outline, as shown in FIG. 1, and which are relatively thin, that is, less than 0.0010 inch wide, and of any suitable diameter, for example about 1 to 3 inches. The blades 10 are each mounted between spacers or washers 12 on a suitable rotating means 14. The washers 12 are of the same shape but preferably of greater thickness than the blades 10 and, in accordance with the present invention, are of greater radius than the blades 10. The radius of the washers 12 exceeds that of the blades 10 by an amount sufficient to assure that when the improved cutting edge is deposited as a layer on the periphery of each blade, such layer will be discontinuous with that deposited on the remaining exposed surface of the assembly, particularly the exposed surfaces of the adjoining washers 12. For such purposes, it has been found that the difference in radius between the washers and blades should be at least twice that of the desired depth of deposit of the cutting layer on the periphery of the blades. The blades 10 can be fabricated from any suitable material which has high structural strength, even though in relatively thin form, and to which a cutting material can be readily bonded at elevated temperature without adversely affecting the blade. In this regard, the cutting blade can be fabricated of havar which is commercially available from the Hamilton Watch Company. Havar is corrosion resistant and non-magnetic and can be age hardened. It has the following composition and properties:

TABLE

| | Percent by wt. |
|---|---|
| Composition: | |
| Cobalt | 41.0–44.0 |
| Nickel | 12.0–14.0 |
| Chromium | 19.0–21.0 |
| Molybdenum | 2.0–2.8 |
| Manganese | 1.55–1.70 |
| Tungsten | 2.30 3.30 |
| Beryllium | 0.02–0.06 |
| Carbon | 0.17–0.23 |
| Iron | Remainder |
| Physical constants: | Values |
| Specific gravity | 8.3 |
| Density, lb/cu. in | 0.300 |
| Thermal coef. expansion/° C. (0–50° C.) $\times 10^{-6}$ | 12.5 |
| Electrical resistance, ohms/cmf | 550 |
| Thermoelasticity, ° C. (0–65° C.) $\times 10^{-5}$ | 51 |
| Modulus of elasticity, p.s.i. $\times 10^{6}$ | 29.5–30.2 |

| | As rolled | As aged |
|---|---|---|
| Tensile strength, p.s.i | 260,000–290,000 | 330,000–360,000 |
| Yield strength, p.s.i (0.02%) | 200,000–220,000 | 260,000–280,000 |
| Rockwel. hardness | 48–50 | 56–60 |

It will be understood that other comparable alloys can be used in place of havar. Thus, stainless steel or another durable metallic material, such as tintanium or brass can be employed. The blades 10 and washers 12 are preferably of relatively uniform width throughout and are each provided with a central aperture (not shown) in order to facilitate mounting of the same on the rotating means 14.

The washers 12 can be fabricated of any suitable material, such as metal, ceramic, fiberglass or the like, which is structurally stable, temperature resistant and durable, and which can be finished with precision so as to provide a close mating or sandwiching with the cutting blade 10 disposed therebetween. Moreover, the washers are fabricated of a material which can be effectively and easily protected against deposition and adhesion of cutting material thereon. In this regard, for example, the spacers 12 can be fabricated of steel or the like which can then be coated with chromium and polished to provide a smooth surface to which the sprayed metal or other material to be deposited will not strongly adhere. Alternatively, the spacers 12 can be coated with a suitable release agent such as magnesium methoxide or the like to facilitate release of flame sprayed material therefrom.

The rotating means 14 can be any suitable means capable of imparting a uniform rate of rotation to the blades and washers mounted thereon. Thus, as shown in FIG. 1, the rotating means 14 may include an elongated shaft or arbor 16, retaining rings 18 and lock nuts 20 adapted to secure the plurality of blades 10 and washers 12 in position on the shaft 16, and a chuck 22 coupling the arbor 16 to a source of rotation (not shown). The rotating means 14 can be fabricated of any suitable material, for example iron, steel or the like, and is preferably treated to prevent adhesion of the flame sprayed material thereto, such treatment comprising, for example, the same type of treatment described for the washers 12. If the washers 12 and rotating means 14 are so treated, the blades 10, washers 12 and rotating means 14 can be disassembled without difficulty. Carbon sleeves can also be employed, if desired, around the shaft 16 to protect the same.

The rotating means 14 can be supported in any suitable manner, for example, by having the arbor 16 supported adjacent the ends thereof, that is, journaled in a suitably shaped aperture 24 of a support stand 26, as schematically illustrated in FIG. 1. The support stand 26 can form, if desired, a part of an enclosure optionally disposed around the apparatus of FIG. 1 so as to facilitate maintenance of an inert gas in contact with the work piece area during flame spraying, if such blanket of inert gas is to be employed. The aperture 24 can be lined with any suitable material, such as a bearing 27 to facilitate rotation of the arbor 16 therein.

Also as illustrated in FIG. 1, flame spraying means 28 are mounted on the support stand 26 in closely spaced relation to the blades 10 and washers 12. The flame spraying means 28 can be of any suitable shape and configuration. As illustrated in FIG. 1, the flame spraying means 28 typically comprises a threaded bar 30 supported in the support frame 26 through apertures 32 lined with bearings 33 and secured in place by means such as lock nuts 34. The threaded bar 30 is secured to a source of rotation (not shown) so that it can be rotated in a controlled manner, whereby a spray unit casing 36 disposed in threaded relation on the bar 30 moves across the width of the assembled cutter blades, depending on the direction of rotation of the bar 30, so that controlled flame spraying of the blades 10 can be effected. The casing 36 adjacent the blades 10 is fitted with a nozzle 38 which extends into a hopper compartment 40 in the interior of the casing 36. A cover 42 is provided for the hopper compartment 40, as shown in FIG. 1, whereby metal to be flame sprayed can be passed into compartment 40. Also communicating with the compartment 40 through apertures (not shown) are a gas line 44 and an air line 46. Upon ignition of the gas-air mixture, metal in compartment 40 is heated to above the melting point thereof and is projected through the nozzle 38 onto the exposed periphery of the blades 10. The flame spraying unit 28 is also provided with suitable gas and vacuum exit lines 48, schematically illustrated in FIG. 1.

It will be obvious that any other comparable flame spraying equipment can be used for effectively projecting a molten metal spray onto the periphery of the blades 10 during rotation thereof. It will be obvious that the flame spraying unit 28 illustrated in FIG. 1 can be fabricated of any suitable material which is temperature resistant and durable and which has the other usual requisites for flame spraying molten metal.

The metal to be flame sprayed onto the periphery of the blades 10 preferably comprises tungsten. However, another high temperature hard metal, which provides a durable cutting or sawing edge can be used, such as tantalum, titanium, an alloy such as tungsten-cobalt alloy, or the like. Thus, molybdenum, columbium, hafnium, zirconium, vanadium, cobalt, nickel and nickel alloys, and rhenium have been employed. Iridium, rhodium, platinum, thorium, palladium and osmium have also been used to a lesser extent. Borides have been formed in situ, for example, by coating the blades with the desired metal, as by flame spraying tantalum, rhenium or zirconium and then converting the deposited metal to the boride in a boron atmosphere. Carbides can be similarly formed utilizing a carbon-containing atmosphere instead of the boron-containing atmosphere.

In accordance with the present method, one or a plurality of the cutter blades 10 of suitable width, for example less than about 0.0004 inch thick, are mounted between washers of somewhat greater radius on the rotating means, and the assembly is then tightly secured and heated to an elevated temperature, for example, 1000–1400° F., such that during flame spraying, the flame sprayed metal permanently bonds to the periphery of the blades 10. If desired, the flame spraying and/or the preheating can be carried out under a blanket of an inert gas such as argon, krypton, xenon or the like, in order to assure absence of substantial contamination of the deposited metal and the blades. The preheat temperature for the rotating means 14, cutter blades 10 and spacers 12 will necessarily depend upon the particular metal or alloy to be flame sprayed, the metal or alloy, etc. of the blades 10 and other factors. Preheat temperatures lower than 1000° F. can be used in selected instances. However, substantially lower temperatures may deleteriously affect the desired diffusional or other permanent bonding between the flame sprayed metal and the periphery of the cutter blade, so that preheat temperatures of about 1000°–1400° F. are employed. Such pre-heating steps can be affected by any suitable means utilizing any suitable pre-heating apparatus. The preheating is preferably done with the flame of the spray unit before the metal deposition step.

Once the rotating means 14, cutter blades 10 and spacers 12 have been increased in temperature to the desired level, they are maintained at about that temperature while the rotation and flame spraying are effected (and, if desired, the inert blanket is maintained). During the flame spraying step, the nozzle 38 is propelled back and forth across the width of the assembly of interspaced cutter blades 10 and spacers 12 at any suitable speed, for example, 20 inches per minute, in order to uniformly and effectively flame spray the entire periphery of each of the cutter blades in the assembly. During such flame spraying, the cutter blades are rotated at any suitable rate, for example, about 50–1000 r.p.m., in order to insure deposition of a uniform depth of the flame sprayed metal on the periphery of the blades.

The flame spraying step is relatively rapid inasmuch as the depth of the metal to be deposited on and bonded to the periphery of the blades is relatively small, usually not more than about .003 inch, preferably less, and is not more than 50 percent of the radial difference between each blade 10 and adjacent washer 12. This is to assure that the continuous coating or layer 50 of flame sprayed metal deposited on the exposed surfaces of the blades 10 is not connected to the layer 50 deposited on the exposed surfaces of the washers 12. In this regard as shown in FIGS. 2 and 3, the layer 50 of flame sprayed metal forms essentially only on those surfaces disposed normal to the direction of flame spraying, i.e. the periphery of the blades 10 and the washers 12, and not to any substantial extent on the exposed side walls 52 of the washers 12 interconnecting the periphery of the blades 10 and the periphery of the washers 12. Accordingly, easy separation of the finished blade 10 from the washers 12 can be effected, and no portion of the layer 50 on blade 10 extends beyond the width or side surfaces of the remainder of blade 10, also as shown in FIG. 3.

Thus, the width of the deposited layer 50 matches that of the blade 10, i.e. 0.0001–0.0010 inch, due to the side shielding and guiding action of the washers 12 adjoining each blade 10. Since the width of the new cutting or sawing edge formed on the periphery of each blade 10 by the flame sprayed metal so precisely matches that of the remainder of the blade, gaps can be cut in magnetic heads and the like, which gaps are defined by parallel side walls and are of the desired small width and substantially match that of the finished blade 10.

After the flame spraying step is completed, the cutter blades 10, washers 12 and rotating means 14 are allowed to cool in the presence or absence of inert or nonoxidizing atmosphere to about ambient temperature and are then separated from one another, as in FIG. 3. The blades 10 are now ready for use in precision sawing and cutting applications. Certain features of the invention are set forth in the following examples:

EXAMPLE I

A plurality of circular havar blades having a thickness of about 0.00025 inch are assemblied on a chrome plated steel arbor, each of the blades being separated from the adjoining blades by a circular chrome plated and polished steel washer having a diameter approximately .012 inch larger than the havar blades. This assembly is then heated to a temperature of about 1000° F. and rotated at about 50 r.p.m. while it is exposed to flame spraying of pure tungsten delivered by a flame spray unit traveling across the width of the assembly at a uniform rate of speed (about 20 inches per minute) so as to assure uniform deposition of the tungsten on the periphery of the blades. When slightly less than .003 inch of tungsten has been applied to the periphery of the blades, the flame spraying is discontinued and the assembly is then allowed to cool to ambient temperature and is disassembled. The finished havar blades are found to have a uniform coating of tungsten approximately .002–.003 inch thick permanently bonded to the periphery thereof, the tungsten layer having a width precisely corresponding to that of the havar blades. The finished blades are then rotated at a speed of 45,000–100,000 r.p.m. and used to cut or saw gaps about 0.003 inch wide in nickel-cobalt magnetic recording heads. The gaps are of uniform width throughout the depth thereof, and are effectively provided without difficulty and without appreciable wear of the blades.

EXAMPLE II

Improved circular cutting and sawing blades are fabricated in accordance with the method of Example I, except that the arbor is of steel over which is disposed a carbon sleeve. Moreover, the blades are of cobalt-nickel alloy, have a uniform width of about .00025 inch and diameter of about 2 inches, and are flame sprayed with titanium at about 1400° F. on a magnesium methoxide coated arbor between magnesium methoxide coated washers having a diameter about 0.004 inch larger than that of the blades. The flame spraying is effected while the blades rotate at about 50 r.p.m. The titanium layer is deposited on the periphery of the finished blades to a depth of slightly less than 0.001 inch, after which the flame spraying is discontinued. The finished blades exhibit uniform width throughout, including the cutting or sawing edge of titanium, with the titanium permanently bonded to the remainder of each blade, a portion of the titanium having diffused into and become a part of the periphery of the substrate of the blade. Moreover, the blades readily and cleanly separate from the adjoining washers and arbor during disassembly. Since the finished individual blades are uniformly balanced, due to the uniform distribution of titanium thereon, they are suitable for high speed relatively vibration-free cutting and sawing of gaps of less than 0.0005 inch width in hard materials such as magnetic heads.

In another test, the periphery of a cobalt-nickel alloy blade is flame sprayed by the above procedure with a 0.001 inch thick layer of tungsten-cobalt alloy to provide the desired cutting edge. In yet another test, according to the described procedure, a stainless steel blade is flame sprayed with tungsten to about 0.002 inch thickness to provide a satisfactory cutting blade.

The foregoing examples clearly illustrate that improved extremely thin cutting and sawing blades can be provided by the present method and apparatus. The blades are characterized by a uniformly distributed and balanced cutting and sawing edge of hard high temperature metal, hard metal carbide or hard metal boride permanently bonded (as by diffusional bonding) to the remainder (substrate) of the blade, and of the same width throughout as the remainder of the blade. Accordingly, each finished blade can be turned at high speed to effect rapid cutting and sawing of metal and the like to provide gaps having parallel side walls and a width substantially corresponding to the width of the blade itself. The blades are durable because the improved edges thereof are hard and resistant to elevated temperatures generated during sawing and cutting of hard work-pieces such as metals, semiconductor crystals and the like.

No supplementary abrasive is needed during the cutting and sawing operation inasmuch as the blades can be driven at very high speeds and at such speeds they are stiff and in one plane, and inasmuch as the flame spraying step deposits the cutting edge on each blade in a manner to provide the edge with very minute surface irregularities. Also as clearly illustrated, the steps of the present method are relatively simple and the components of the present apparatus are relatively inexpensive and are readily available. The apparatus and method are highly efficient and capable of producing desired improved blades of uniformly high quality, particularly utilizing the flame spraying technique. Further advantages of the invention are as set forth in the foregoing description.

While the invention has been particularly shown and described with reference to a preferred embodiment thereof, it will be understood by those skilled in the art that various changes in form and details may be made without departing from the spirit and scope of the invention.

What is claimed is:

1. An improved cutting and sawing blade, said blade having a width of between about 0.0001 and about 0.001 inch, said blade comprising a metallic substrate stable to a temperature of at least about 1000° F., and a peripheral layer of hard, high temperature resistant metal-containing cutting and sawing material permanently bonded to said substrate, the material of said layer having improved cutting and sawing characteristics over those of said substrate, said peripheral layer having a width substantially identical to that of said substrate and an essentially uniform depth of not more than about 0.005 inch.

2. The improved blade of claim 1 wherein said blade is substantially circular, wherein substrate is a metal which is temperature resistant up to at least about 1400° F., and wherein the cutting and sawing edge of said peripheral layer as of metal which has minute surface irregularities and an average depth of not more than 0.003 inch.

3. The improved blade of claim 2 wherein said peripheral layer comprises tungsten and wherein said substrate comprises cobalt- and nickel-containing alloy.

4. The improved blade of claim 2 wherein said peripheral layer comprises titanium and wherein said substrate comprises cobalt- and nickel-containing alloy.

5. The improved blade of claim 2 wherein said peripheral layer comprises tungsten-cobalt and wherein said substrate comprises cobalt- and nickel-containing alloy.

References Cited

UNITED STATES PATENTS

| | | | |
|---|---|---|---|
| 2,903,782 | 9/1959 | Cowley | 29—103 |
| 3,074,211 | 1/1963 | Sacco | 51—206 |
| 3,106,319 | 10/1963 | Fischer | 51—206 X |
| 3,283,448 | 11/1966 | Thompson | 51—206 |
| 3,290,834 | 12/1966 | Lindblad | 51—206 |

HARRISON L. HINSON, Primary Examiner

U.S. Cl. X.R.

29—95; 51—206